United States Patent
Elgarat

(10) Patent No.: US 9,606,901 B1
(45) Date of Patent: Mar. 28, 2017

(54) SYSTEM, METHOD, AND COMPUTER PROGRAM FOR GENERATING A DETAILED DESIGN OF AT LEAST ONE TELECOMMUNICATIONS BASED INTEGRATION TESTING PROJECT

(71) Applicant: Amdocs Software Systems Limited, Dublin (IE)

(72) Inventor: Sharon Elgarat, Kibbutz Mefalsim (IL)

(73) Assignees: AMDOCS SOFTWARE SYSTEMS LIMITED, Dublin (IE); AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 14/807,736

(22) Filed: Jul. 23, 2015

Related U.S. Application Data

(60) Provisional application No. 62/033,603, filed on Aug. 5, 2014.

(51) Int. Cl.
*G06F 9/44* (2006.01)
*G06F 11/36* (2006.01)

(52) U.S. Cl.
CPC .......... *G06F 11/3684* (2013.01); *G06F 8/20* (2013.01); *G06F 8/70* (2013.01); *G06F 8/71* (2013.01); *G06F 11/3688* (2013.01)

(58) Field of Classification Search
CPC .......... G06F 8/20; G06F 8/71; G06F 11/3664; G06F 11/3684; G06F 11/3688; G06F 9/44589; G06Q 10/06
See application file for complete search history.

(56) References Cited

U.S. PATENT DOCUMENTS

| | | | |
|---|---|---|---|
| 7,330,722 B1 * | 2/2008 | Kirtley | H04L 41/08 455/423 |
| 8,132,157 B2 * | 3/2012 | Dhuvur | G06F 11/3688 714/38.1 |

(Continued)

OTHER PUBLICATIONS

Augsornsri et al., "Design of a Tool for Checking Integration Testing Coverage of Object-Oriented Software", IEEE, Aug. 2013, pp. 1-4, <http://ieeexplore.ieee.org/abstract/document/6579458/>.*

(Continued)

*Primary Examiner* — Thuy Dao
*Assistant Examiner* — Ben C Wang
(74) *Attorney, Agent, or Firm* — Zilka-Kotab, PC

(57) ABSTRACT

A system, method, and computer program product are provided for generating a detailed design of at least one telecommunications based integration testing project. In use, a scope of at least one integration testing project is analyzed. Additionally, vendor-related information associated with the at least one integration testing project is tracked. Further, an activity library associated with the at least one integration testing project is generated. In addition, scenarios associated with the at least one integration testing project are determined. Furthermore, a high level design of the at least one integration testing project is presented for review. Still yet, testing instructions are generated based on the scenarios associated with the at least one integration testing project. Moreover, a detailed design of the at least one integration testing project is generated utilizing the testing instructions and the activity library.

11 Claims, 4 Drawing Sheets

(56) References Cited

U.S. PATENT DOCUMENTS

| | | | | |
|---|---|---|---|---|
| 8,418,147 | B1* | 4/2013 | Odenwelder | G06F 11/3684 717/128 |
| 8,423,962 | B2* | 4/2013 | Becker | G06Q 10/06 717/124 |
| 8,635,056 | B2* | 1/2014 | Bassin | G06F 11/3676 703/22 |
| 8,739,047 | B1* | 5/2014 | Holler | G06F 3/04842 715/221 |
| 8,826,084 | B1* | 9/2014 | Gauf | G06F 11/3688 714/32 |
| 2005/0166094 | A1* | 7/2005 | Blackwell | G06F 11/3664 714/38.14 |
| 2009/0164941 | A1* | 6/2009 | Johnson | G06F 11/3684 715/810 |
| 2009/0313606 | A1* | 12/2009 | Geppert | G06F 11/3692 717/124 |
| 2010/0250326 | A1* | 9/2010 | Channabasavaiah | G06Q 10/0637 705/7.36 |
| 2011/0066420 | A1* | 3/2011 | Bassin | G06F 11/3676 703/22 |
| 2011/0066486 | A1* | 3/2011 | Bassin | G06Q 10/00 705/14.43 |
| 2011/0066887 | A1* | 3/2011 | Bassin | G06F 11/3672 714/27 |
| 2012/0060144 | A1* | 3/2012 | Novak | G06Q 10/06 717/105 |
| 2012/0253728 | A1* | 10/2012 | Chamas | G06F 11/2294 702/109 |
| 2012/0323550 | A1* | 12/2012 | Bassin | G06F 11/3676 703/22 |
| 2013/0159963 | A1 | 6/2013 | Dhalait | |
| 2014/0089900 | A1* | 3/2014 | Shrivastava | G06F 9/44589 717/126 |
| 2014/0129173 | A1* | 5/2014 | Kit | G06F 11/263 702/123 |
| 2015/0254163 | A1* | 9/2015 | Baril | G06F 11/3636 714/38.1 |
| 2015/0254165 | A1* | 9/2015 | Baril | G06F 11/3676 714/38.1 |
| 2015/0378875 | A1* | 12/2015 | Sivanesan | G06F 11/3684 717/124 |
| 2016/0085663 | A1* | 3/2016 | Best | G06F 11/3692 714/38.1 |

OTHER PUBLICATIONS

Sami Torniainen, "Improving Effectiveness of Regression Testing of Telecommunications System Software", Feb. 2008, Helsinki University of Technology, pp. 1-57; <http://koodaripalvelut.com/thesis_28022008_final.pdf>.*

Collins et al., "Software Test Automation Practices in Agile Development Environment: An Industry Experience Report", Jun. 2012, IEEE, pp. 57-63; <http://dl.acm.org/citation.cfm?id=2663620&CFID=692369721&CFTOKEN=17036066>.*

Westermann et al., "Performance Cockpit: Systematic Measurements and Analyses", Mar. 2011, ACM, pp. 421-422; <http://dl.acm.org/citation.cfm?id=1958808&CFID=692369721&CFTOKEN=17036066>.*

* cited by examiner

SYSTEM, METHOD, AND COMPUTER PROGRAM FOR GENERATING A DETAILED DESIGN OF AT LEAST ONE TELECOMMUNICATIONS BASED INTEGRATION TESTING PROJECT

CLAIM OF PRIORITY AND RELATED APPLICATIONS

This application claims the benefit of U.S. Provisional Application No. 62/033,603, filed Aug. 5, 2014, the entire contents of which are incorporated herein by reference.

FIELD OF THE INVENTION

The present invention relates to integration testing of software, and more particularly to efficient and effective test design for integration testing in a multi-vendor software delivery project.

BACKGROUND

The testing of integrated software is a critical step in the software development lifecycle. The objective of the integration testing is to verify and validate the flow of activities through external interfaces between systems within the software solution, the hardware and the configuration thereof, and to prevent malfunction of the software when in use.

User acceptance testing (UAT), also called beta testing, and/or end user testing, is a phase of software development in which the software is tested in the "real world" (e.g. at a customer premises, etc.) by a professional testing team, accompanied by an intended audience or a business representative. The goal of user acceptance testing is to assess whether a system can support day-to-day business and user scenarios and ensure the system is sufficient and correct for business usage.

During the acceptance testing phase of a project, all vendors must deliver software as their part of a wider solution for a customer's needs. In addition to testing to verify each function in each system is properly working, the acceptance testing phase includes a set of tests which is intended to certify that interfaces between systems are properly working as small chains between two systems, or as larger chains between several systems, which move data transactions between them for a single purpose. This test, accompanied with functional tests, proves system readiness to a wider end-to-end test, which combines both functional aspects with a full integration.

Integration testing is a preliminary stage of acceptance testing, which is done at the point vendors are ready to deliver their software to acceptance tests (e.g. system tests were performed, installation on site was accomplished, and basic connectivity tests were performed). The purpose of the integration tests is to make the solution mature for end-to-end testing by cleaning up defects coming from the communication between chains of modules in the solution delivered by different vendors. A chain can be defined as a single interface between two applications or a longer interface flow in which information is passed through several interfaces one after the other before it reaches its destination.

Performing an efficient integration test faces two main challenges. The first main challenge is removing dependencies from functional aspects which still did not pass certification. The second main challenge is aligning all vendors to a single plan and properly preparing to delay options at each vendor's delivery, to be able to still utilize the environment and the software which was delivered, to the best benefit of the project.

Additional challenges on the road to a successful integration test include generating an ability to receive inputs for the integration design from all vendors and properly utilizing the integrated environment resources, as well as the challenge of performing a maximum number of tests while allowing a maximum number of critical customer activities to have availability of the unique resources included in the end-to-end integrated environment.

There is thus a need for addressing these and/or other issues associated with the prior art.

SUMMARY

A system, method, and computer program product are provided for generating a detailed design of at least one telecommunications based integration testing project. In use, a scope of at least one integration testing project is analyzed. Additionally, vendor-related information associated with the at least one integration testing project is tracked. Further, an activity library associated with the at least one integration testing project is generated. In addition, scenarios associated with the at least one integration testing project are determined. Furthermore, a high level design of the at least one integration testing project is presented for review. Still yet, testing instructions are generated based on the scenarios associated with the at least one integration testing project. Moreover, a detailed design of the at least one integration testing project is generated utilizing the testing instructions and the activity library. This methodology can be performed supported by dedicated tools or without any tools (documenting entities on paper), as long as the processes detailed by the methodology are followed there is no dependency on any technology.

DETAILED DESCRIPTION

Figure 1:
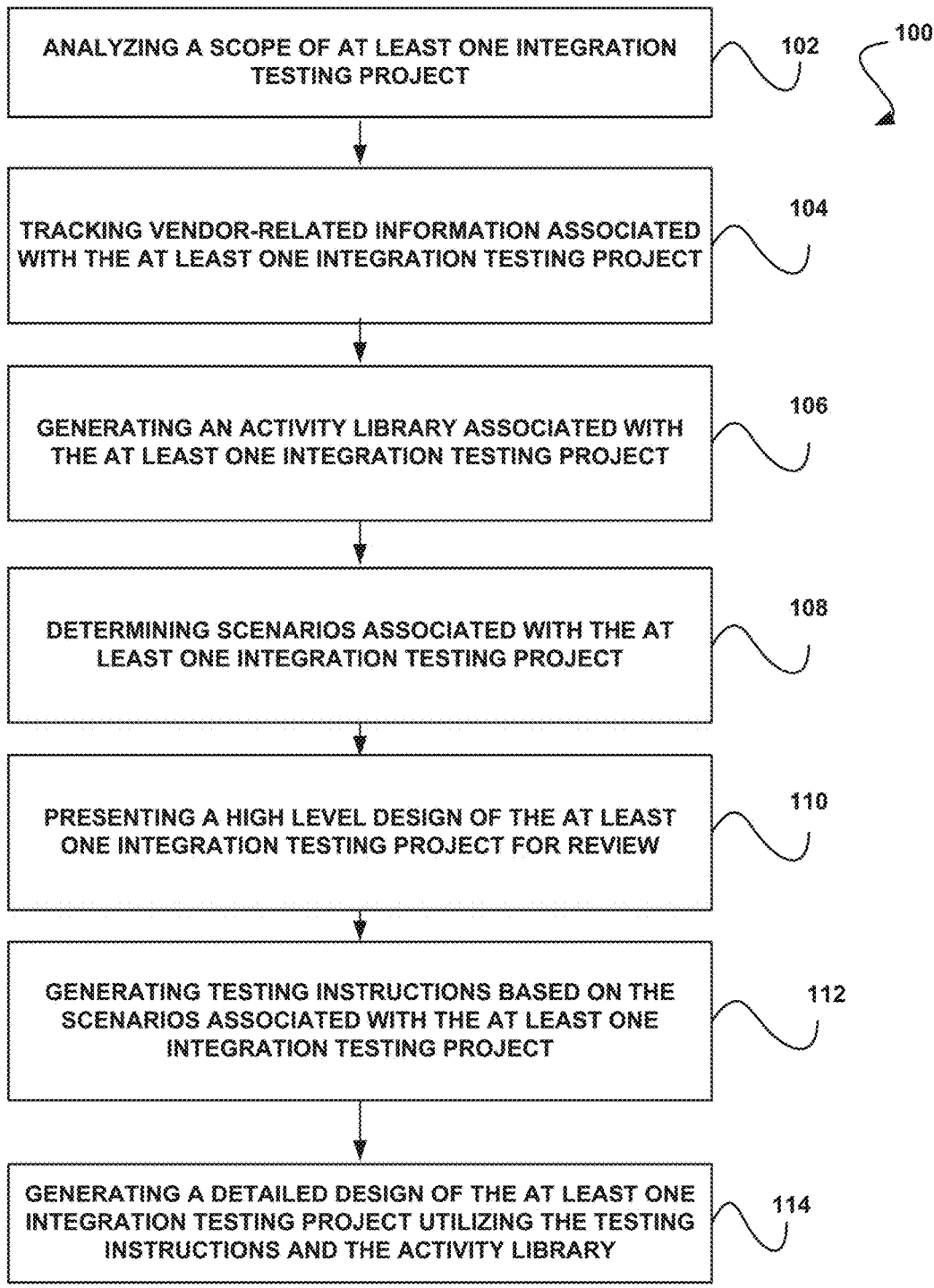
FIG. 1 illustrates a method for generating a detailed design of at least one telecommunications based integration testing project, in accordance with one embodiment.

FIG. 1 illustrates a method 100 for generating a detailed design of at least one telecommunications based integration testing project, in accordance with one embodiment.

As shown, a scope of at least one integration testing project is analyzed. See operation 102. The integration testing project may be associated with any software and/or system and may be associated with any market/industry, such as the telecommunications market/industry, etc.

Additionally, vendor-related information associated with the at least one integration testing project is tracked. See operation 104. Further, an activity library associated with the at least one integration testing project is generated. See operation 106.

In addition, scenarios associated with the at least one integration testing project are determined. See operation 108. Furthermore, a high level design of the at least one integration testing project is presented for review. See operation 110.

Still yet, testing instructions are generated based on the scenarios associated with the at least one integration testing project. See operation 112. Moreover, a detailed design of the at least one integration testing project is generated utilizing the testing instructions and the activity library. See operation 114.

In one embodiment, analyzing the scope of the integration testing project includes breaking down data flows into integration chains indicating how data moves between systems. Further, analyzing the scope of the integration testing project may include removing data dependencies by creative data reuse or data simulators.

As an option, analyzing the scope of at least one integration testing project may include describing all interfaces in the scope as integration chains with minimal dependencies on each chain and minimal interfaces per chain, while still allowing a user to view data flows properly in a higher solution structure.

The acceptance testing phase includes a set of tests which is intended to certify interfaces between systems are properly working as small chains between two systems, or as larger chains between several systems, which move data transactions between them for a single purpose. This test, accompanied with functional tests proves system readiness to a wider end-to-end test, which combines both functional aspects with a full integration.

Accordingly, in one embodiment, analyzing the scope of the integration testing project may further include identifying the integration chains, input parameters associated with the integration chains that generate permutations, and possible validation points for each data produced in the integration chains.

Further, tracking vendor-related information associated with the integration testing project may include a variety of actions, such as logging all interfaces in the scope of the integration testing project to a test management console. In this case, tracking vendor-related information associated with the integration testing project may further include defining a new requirements type as an interface, modifying fields to support data required to manage the interface, and introducing a new workflow for this type to describe a lifecycle of an interface delivery to a live system. In one embodiment, tracking vendor-related information associated with the integration testing project may include mapping all interfaces to the test design.

Additionally, in one embodiment, generating the activity library associated with the integration testing project may include generating standalone generic building blocks for the detailed design. In this case, the standalone generic building blocks may describe actions needed to operate or verify each interface based on its structure and transaction type. Further, the activities may be ordered in the activity library according to vendor, application, tested entity, and/or function.

Further, determining the scenarios associated with the integration testing project may include utilizing various information associated with full coverage, risk calculation, business priority, and/or customization level, while filtering using a pairwise reduction approach to reach a minimal set. In one embodiment, determining the scenarios associated with the integration testing project may include breaking down scenarios into multiple sub-scenarios which will allow quick identification of the scope.

Still yet, in one embodiment, generating the testing instructions based on the scenarios associated with the integration testing project may include converting an integration chain high level description to actual testing instructions describing which activities need to be performed and at which conditions to generate a flow. In this case, generating the testing instructions based on the scenarios associated with the at least one integration testing project may further include mapping the interfaces to the tests.

This may also include deriving the detailed design from the high level calendar scenarios following a traditional test design methodology. Moreover, generating the detailed design of the integration testing project may include expanding each item that is specified in the high level scenarios to include exact steps required to perform an entire activity, and linking test cases to the interfaces which provide the real time view of interface delivery status.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
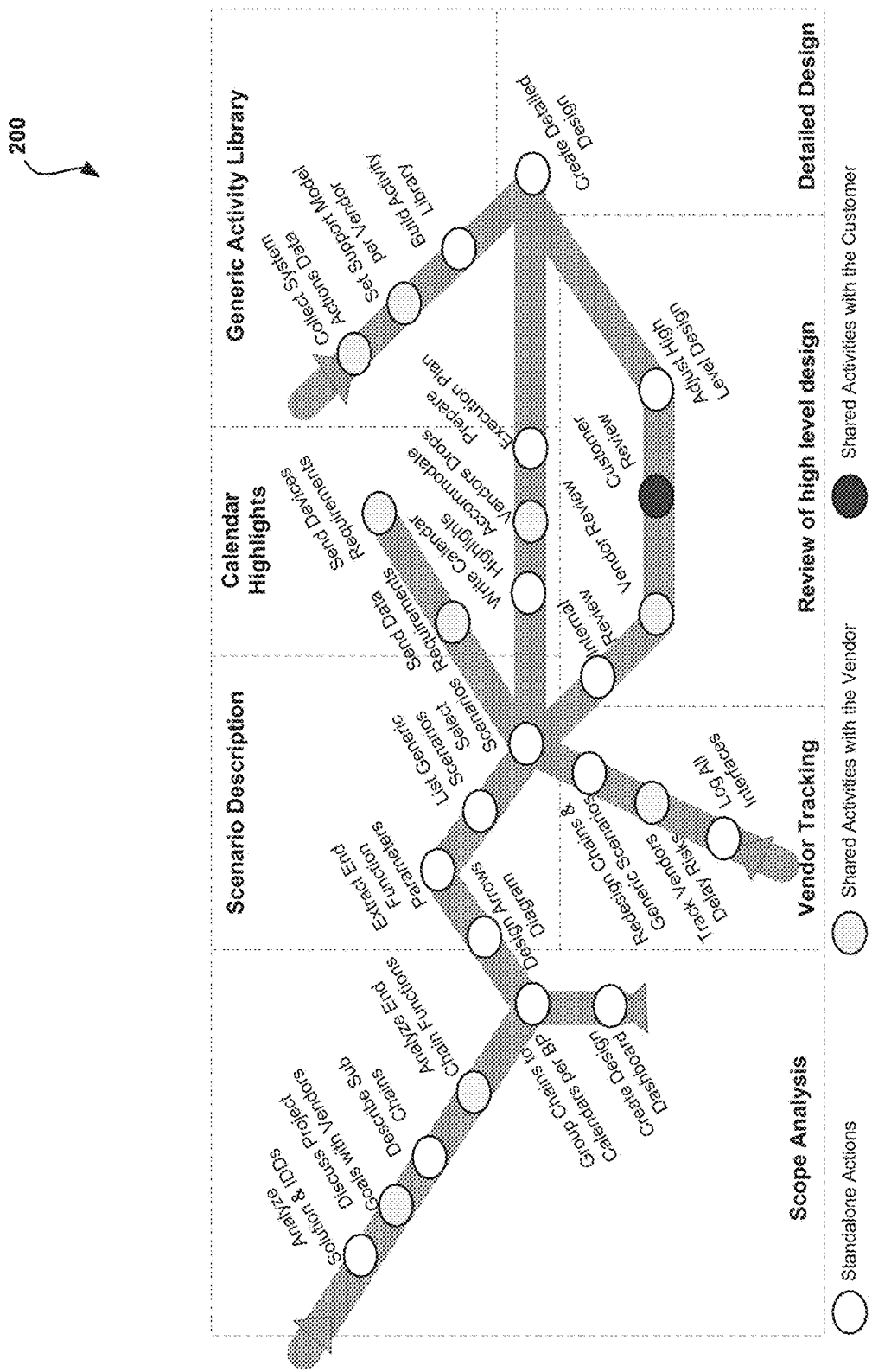
FIG. 2 illustrates a flow diagram for generating a detailed design of at least one telecommunications based integration testing project, in accordance with one embodiment.

FIG. 2 illustrates a flow diagram 200 for generating a detailed design of at least one telecommunications based integration testing project, in accordance with various embodiments. As an option, the flow diagram 200 may be implemented in the context of the details of FIG. 1. Of course, however, the flow diagram 200 may be implemented in the context of any desired environment. Further, the aforementioned definitions may equally apply to the description below.

The flow diagram 200 describes a methodology for solution level integration test design. The integration test, also known as system integration test (SIT), is a crucial test phase in which the systems involved in a solution are put together for the first time and must provide an integrative common goal service. The techniques described herein provide a top value focused methodology to cope with the unique challenges this test phase introduces by making use of known testing tools in a new creative manner, to properly control the many dependencies generated by multiple vendors. The techniques described herein enable the project to meet key milestones by focusing on the top value each vendor contributes for top urgent integration points, while evaluating from an overall solution readiness view.

Various benefits result from such techniques, such as the ability to reuse existing testing management tools for creative efficient capabilities; a shortened time to value by aligning vendors on top priority items based on a higher readiness view; the ability to produce flexible test designs able to mitigate any vendor delay in delivery of applications required for the solution; the enablement and support of end to end test level and business user testing; utilization of key environment elements that are focused to maximize availability for additional customer key activities; and the enablement of early detection of top priority complex integrative errors and shortened resolution lifecycle.

The integration workflow is built to introduce maximum modularity. The power of this methodology comes from the removal of traditional dependencies which help inserting flexibility for changes in software delivery that are so common during integration test level.

The integration workflow allows working in parallel on maximum possible testable items, placing dependencies only where the atomic test still mandates them. While traditional testing methodologies guide for sequential progress, aiming to work from a full picture at each stage, in integration methodology the dependencies on multiple vendor's readiness forces a more agile or spiral approach.

The different stages can therefore be done sequential within a single integration chain of interfaces but with no dependencies between chains of un-related interfaces in scope.

The flow describes a best practice example of the methodology. Other examples can combine diagram flows to graphically describe the scenarios before detailing them, or the use of use cases as the short description of the sub chain scenarios.

As shown in the flow diagram 200, scope analysis is one possible starting point. Scope analysis may include analyzing a solution's scope with a top down approach, working from the highest level view of the solution, breaking down the full flows to integration chains in which data moves between systems, and removing dependencies by creative data reuse or data simulators. Scope analysis may be implemented to describe all interfaces in a scope in integration chains with minimal dependencies on each chain and minimal interfaces per chain while still allowing to view data flows properly in the higher solution structure. At this stage, designers may identify the chains, the input parameters which generate permutations, and the possible validation points for each data produced in the chain.

In the context of the present description, a chain refers to a series of interfaces which lead data through several systems. The data transaction generated at the beginning of the chain might be processed several times in the course of a chain but not through manual intervention.

A chain ends when the data arrives at the point it is no longer automatically processed (either the end point or a station in which a user has to perform a manual action on the data). For the purpose of integration testing the shortest chains possible may be defined. At a more advanced stage of integration, several chains may be combined to determine how data flows on a larger end-to-end flow. However, for the initial stage of integration test to be efficient, with minimal dependencies, it is usually better to define the chains small, and use simulators if needed, to setup data preparation for a mid-flow chain to be triggered.

Vendors tracking may be a second independent starting point of the flow 200. In a vendor tracking stage, a testing lead may be asked to log all interfaces in a scope to a test management console, which may be available for all vendors providing systems to the solution. For this purpose, the originally intended requirements management tool may be reused, defining a new requirements type as an interface, modifying its fields to support data required to manage an interface and introducing a new workflow for this type to describe the lifecycle of an interface delivery to the live system.

Once logged, the tool may allow mapping of all interfaces to the test design. This enables properly tracking readiness and performing online adjustments of test plans based on real delivery dates. Test teams using this mechanism in execution can therefore ensure progress is focused on high readiness items and defects are mapped to the interfaces to avoid investing effort on elements in the solution which depend on a defected interface.

A third possible starting point to the flow 200 is by generating a generic activity library. This is a bottom up approach allowing a user to start generating standalone generic building blocks for detail design, describing for automation or manual testing the actions needed to operate or verify each interface based on its structure and transaction types. Activities may be ordered in the library according to vendor, application, tested entity, and function. Proper structure is beneficial to promote reuse.

Another stage in the flow 200 includes a scenario description/determination. Similarly to traditional testing methodologies, the selection of scenarios may be done with standard considerations in mind such as full coverage, risk calculation, business priority, and customization level, while filtering using a pairwise reduction approach to reach a minimal set. However, integration methodology asks constantly to limit dependencies and increase flexibility, so potentially longer scenarios are often broken down to multiple sub-scenarios which will allow the user quick identification of scope enabled even when a vendor fails to deliver on time. This adds additional test cases to the plan which could have been avoided had the scenario was designed as one unit. The cost of the additional tests is trivial in comparison to the added value introduced by the flexibility gained.

Further, the flow 200 allows for review of high level design. A crucial component of the workflow is the review process. Traditional testing reviews are kept including the customer business and information technology (IT) review. However, integration testing requires an additional level of review, the vendor review. As each interface has two contributing vendors, the vendor review often allows to bridge scoping gaps even for the vendors themselves.

The flow 200 also includes a calendar highlights stage, where test instructions are generated. Here, the integration chain high level description turns to actual testing instructions, describing which activities need to be performed and at which conditions to generate a flow.

When done from proper testing tools linked to the management console in which the interfaces were logged, this stage includes mapping the interfaces to the tests. This action allows tracking impacts of interface delays or defects on all related tests and speed up testing team ability to mitigate, re-plan and avoid huge wasted effort, thus promoting focus on items which bring value.

A detailed design is derived from the high level calendar scenarios following traditional test design methodology. Here, each item that had been specified the level of high level scenarios is expanded to include the exact steps required to perform the entire activity. The test cases generated are all linked to the interfaces which provide the real time view of the interface delivery status. Such links allow at the end of the execution to produce clear certification reports, focused on the exact testing status of each interface (status of test cases executed and status of defects opened).

Implementing the techniques described herein allows for the reuse of requirements to map interface lifecycle to testware directly and allows full control of interface delivery impacts on testing, with the ability to report the exact certification state of each interface in scope.

Figure 3:
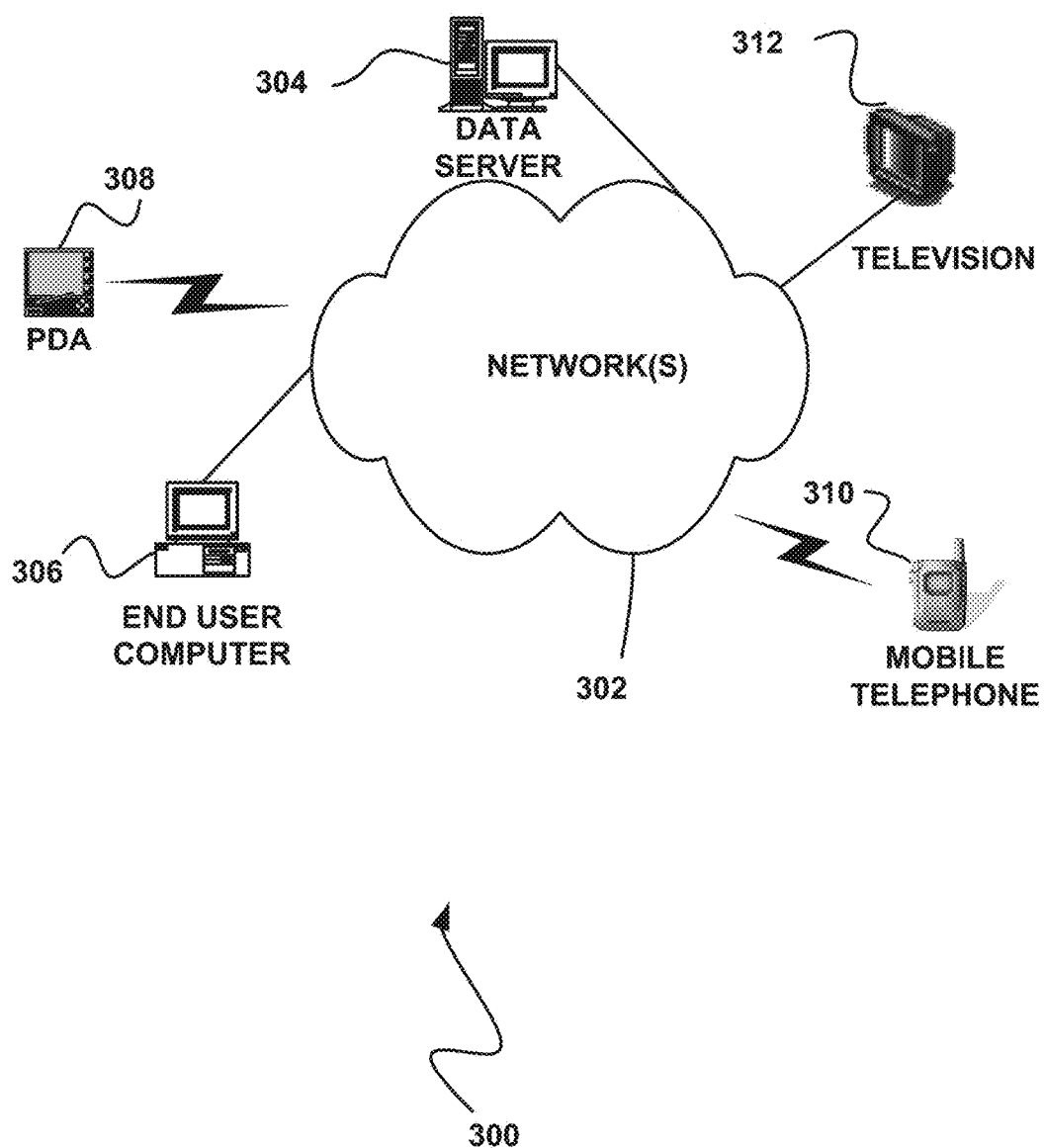
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
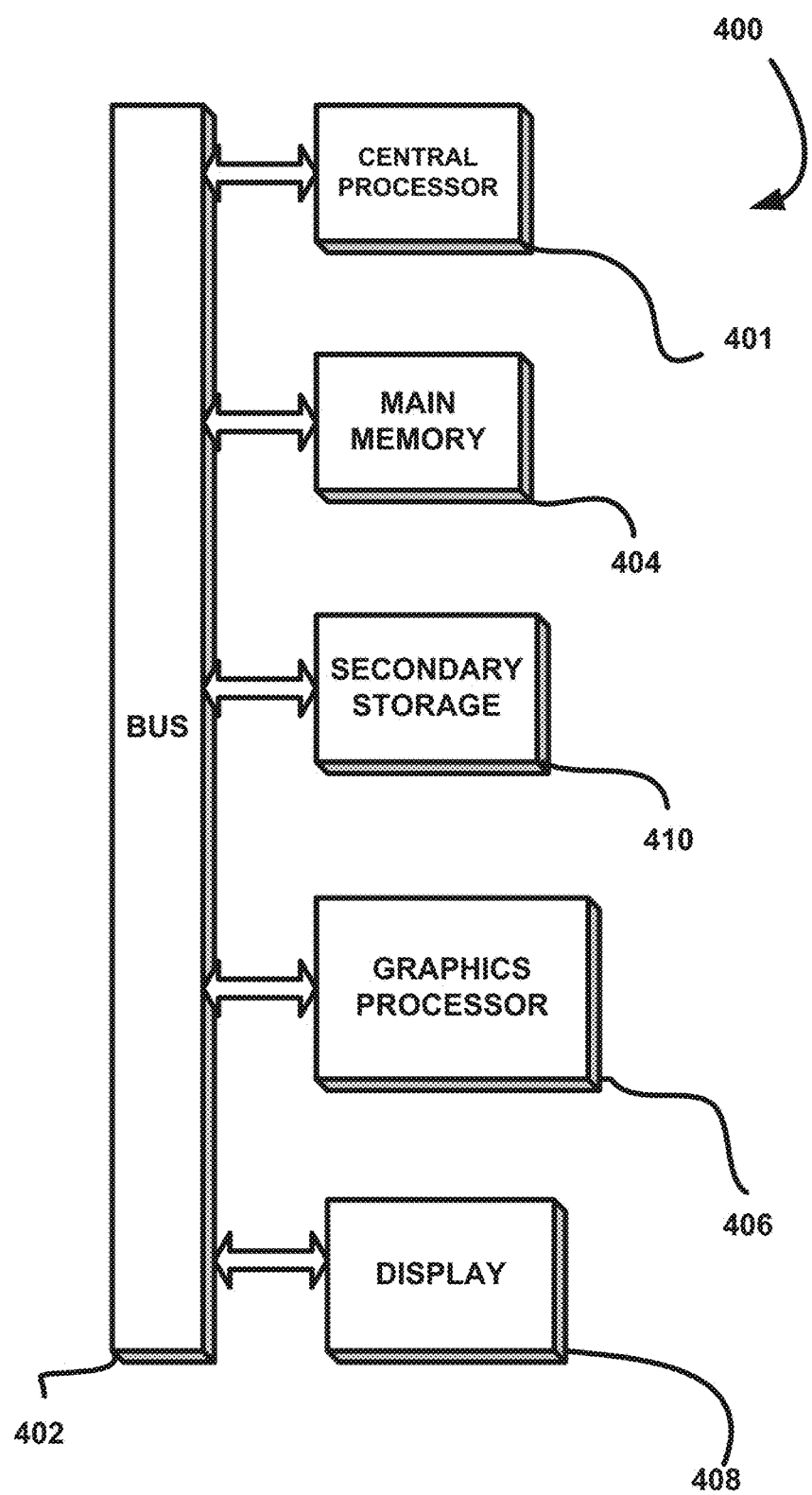
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
analyzing, through a computer system, a scope of at least one integration testing project, the integration testing project being associated with a plurality of systems provided by different vendors, and the analyzing including converting data flows into integration chains which are each a series of interfaces by which data moves between the systems for automatic processing thereof by the systems;
tracking, through the computer system, vendor-related information associated with the at least one integration testing project, including logging the interfaces to a test management console available to the different vendors and mapping the interfaces to the integration testing project;
generating, through the computer system, an activity library associated with the at least one integration testing project, the activity library including standalone generic building blocks that describe actions which verify each of the interfaces;
determining, through the computer system, scenarios associated with the at least one integration testing project;
presenting, through the computer system, a high level design including the integration chains of the at least one integration testing project for review by at least the vendors;
generating, through the computer system, testing instructions based on the scenarios associated with the at least one integration testing project and the high level design; and
generating, through the computer system, a detailed design of the at least one integration testing project utilizing the testing instructions and the activity library by generating test cases that are linked to the interfaces.

2. The method of claim 1, wherein analyzing the scope of the at least one integration testing project further includes removing dependencies by creative data reuse or data simulators.

3. The method of claim 2, wherein analyzing the scope of the at least one integration testing project further includes describing all interfaces in the scope as the integration chains with minimal dependencies on each integration chain and minimal interfaces per integration chain, while still allowing a user to view data flows properly in a higher solution structure.

4. The method of claim 3, wherein analyzing the scope of the at least one integration testing project further includes identifying the integration chains, input parameters associated with the integration chains that generate permutations, and possible validation points for each data produced in the integration chains.

5. The method of claim 1, wherein determining the scenarios associated with the at least one integration testing project includes utilizing information associated with full coverage, risk calculation, business priority, and customization level, while filtering using a pairwise reduction approach to reach a minimal set.

6. The method of claim 5, wherein determining the scenarios associated with the at least one integration testing project includes breaking down scenarios into multiple sub-scenarios which will allow quick identification of the scope.

7. The method of claim 1, wherein generating the testing instructions based on the scenarios associated with the at least one integration testing project includes converting an integration chain high level description to actual testing instructions describing which activities need to be performed and at which conditions to generate a flow.

8. The method of claim 7, wherein generating the testing instructions based on the scenarios associated with the at least one integration testing project further includes mapping the interfaces to tests.

9. The method of claim 1, wherein linking test cases to the interfaces provides a real time view of interface delivery status.

10. A computer program product embodied on a non-transitory computer readable medium, comprising:
computer code for analyzing, through a computer system, a scope of at least one integration testing project, the integration testing project being associated with a plurality of systems provided by different vendors, and the analyzing including converting data flows into integration chains which are each a series of interfaces by which data moves between the systems for automatic processing thereof by the systems;
computer code for tracking, through the computer system, vendor-related information associated with the at least one integration testing project, including logging the interfaces to a test management console available to the different vendors and mapping the interfaces to the integration testing project;

computer code for generating, through the computer system, an activity library associated with the at least one integration testing project, the activity library including standalone generic building blocks that describe actions which verify each of the interfaces;

computer code for determining, through the computer system, scenarios associated with the at least one integration testing project;

computer code for presenting, through the computer system, a high level design including the integration chains of the at least one integration testing project for review by at least the vendors;

computer code for generating, through the computer system, testing instructions based on the scenarios associated with the at least one integration testing project and the high level design; and computer code for generating, through the computer system, a detailed design of the at least one integration testing project utilizing the testing instructions and the activity library by generating test cases that are linked to the interfaces.

11. A computer system comprising:

a memory system; and one or more processing cores coupled to the memory system and that are each configured to:

analyze a scope of at least one integration testing project, the integration testing project being associated with a plurality of systems provided by different vendors, and the analyzing including converting data flows into integration chains which are each a series of interfaces by which data moves between the systems for automatic processing thereof by the systems;

track vendor-related information associated with the at least one integration testing project, including logging the interfaces to a test management console available to the different vendors and mapping the interfaces to the integration testing project;

generate an activity library associated with the at least one integration testing project, the activity library including standalone generic building blocks that describe actions which verify each of the interfaces;

determine scenarios associated with the at least one integration testing project;

present a high level design including the integration chains of the at least one integration testing project for review by at least the vendors;

generate testing instructions based on the scenarios associated with the at least one integration testing project and the high level design; and generate a detailed design of the at least one integration testing project utilizing the testing instructions and the activity library by generating test cases that are linked to the interfaces.

* * * * *